Jan. 19, 1960    M. FORMAN ET AL    2,921,686
FLUID FILTERING APPARATUS WITH REMOVABLE FILTER HOLDER
Filed Dec. 3, 1956    3 Sheets-Sheet 1
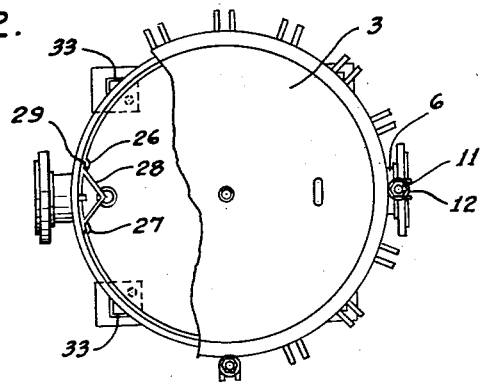
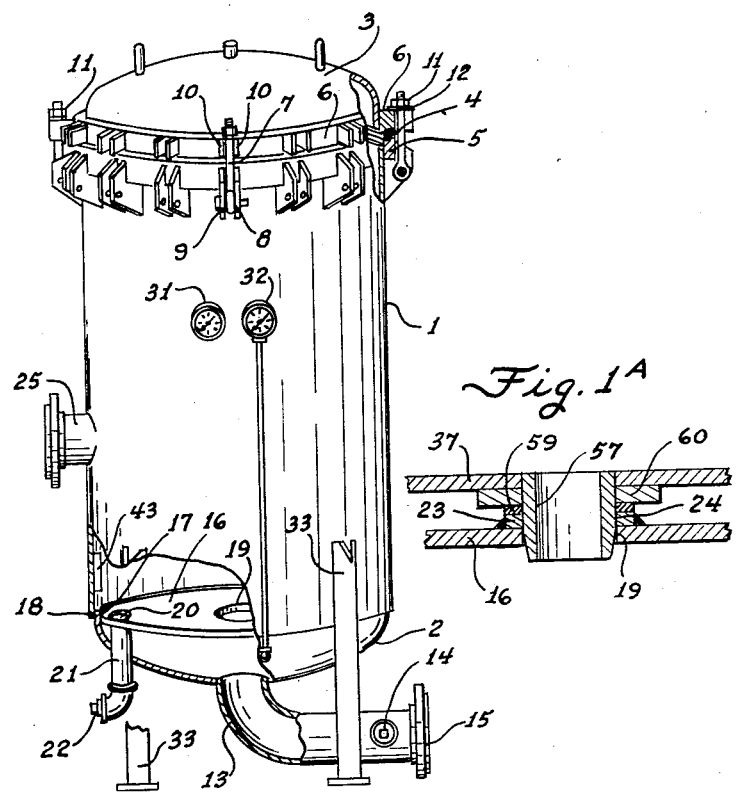
MILTON FORMAN
AND    INVENTORS.
HOWARD D. URDANOFF
BY Albert M. Parker
ATTORNEY.

Jan. 19, 1960  M. FORMAN ET AL  2,921,686
FLUID FILTERING APPARATUS WITH REMOVABLE FILTER HOLDER
Filed Dec. 3, 1956  3 Sheets-Sheet 2

MILTON FORMAN
AND   INVENTORS.
HOWARD D. URDANOFF
BY

*Albert M. Parker*

ATTORNEY.

Jan. 19, 1960     M. FORMAN ET AL     2,921,686
FLUID FILTERING APPARATUS WITH REMOVABLE FILTER HOLDER
Filed Dec. 3, 1956                                3 Sheets-Sheet 3

MILTON FORMAN
AND HOWARD D. URDANOFF     INVENTORS.

BY Albert M. Parker

ATTORNEY.

United States Patent Office 2,921,686
Patented Jan. 19, 1960

2,921,686

FLUID FILTERING APPARATUS WITH REMOVABLE FILTER HOLDER

Milton Forman, New York, N.Y., and Howard D. Urdanoff, North Bergen, N.J., assignors to Alpha Tank Company, Inc., Long Island City, N.Y., a corporation of New York Application December 3, 1956, Serial No. 625,684

15 Claims. (Cl. 210—323)

This invention relates to filters for use in the filtering of fluids. More particularly it is concerned with readily removable and interchangeable holders for filter cartridges and for provisions for mounting the same in filter shells.

Heretofore the common practice in the manufacture of filters having tank-like shells or bodies with filter cartridges therein has been to fabricate the tank or shell for the reception of one particular type or size of cartridge. The cartridges have generally been mounted individually in some specially formed member secured within the shell so that it has been necessary to remove the cartridges individually from such member and either clean, or replace, them or replace them with others while they were being cleaned. Where removable mountings for the filter cartridges per se have been provided, the constructions involved have been complicated providing such things as members in the form of headers for engaging both ends of the cartridges, while the filter shells were specially formed to receive and clamp the headers tightly in position within the shells. The necessary inclusion of these and other limiting features of the prior art constructions have precluded any real flexibility in filter operations and have made those operations unnecessarily expensive from the standpoints of both equipment and labor.

The instant invention eliminates the foregoing and other drawbacks of prior art constructions and carries the art of filtering a substantial step forward. It does so by providing a simple and interchangeable holder for filter cartridges, by the provision of simple cooperative means between such holder and the filter shell for effectively seating the holder therein, and by utilizing inherent characteristics such as the weight of the holder and cartridge asssembly and the force provided by the pressure on the fluid within the filter shell for maintaining the holder in fixed liquid-tight position in the shell. Thus the holder and cartridge assembly merely needs to be lowered into place in the shell, when being installed, and lifted out therefrom for cleaning and replacement. No clamping or securing means is employed. A holder and cartridge assembly can be removed and immediately replaced by another. Also, the cartridges are merely secured in the holder at one end and are, at all times, free at the other end.

It is, accordingly, an object of the invention to simplify the interchangeable mounting of filter cartridges within filter shells.

Another object is to render such mounting fully effective without employing extraneous clamping or securing means.

Still another object is to provide readily removable and replaceable filter cartridge holders for filtering devices.

A further object is to provide such holders on which filter cartridges of different sizes and arrangement may be mounted.

A still further object is to reduce the labor involved in removing and replacing filter cartridges with respect to filter shells.

Further and more detailed objects of the invention will in part be obvious and in part pointed out as the description of the invention, taken in conjunction with the accompanying drawing proceeds.

In that drawing:

Fig. 1 is a perspective elevational view of a filter shell in accordance with the invention, with a part of that shell broken away to show the interior thereof.

Fig. 1a is a fragmentary plan view of a slightly modified portion of filter shell construction.

Fig. 2 is a top plan view of the shell of Fig. 1, again with a part broken away to show the interior.

Figure 4:
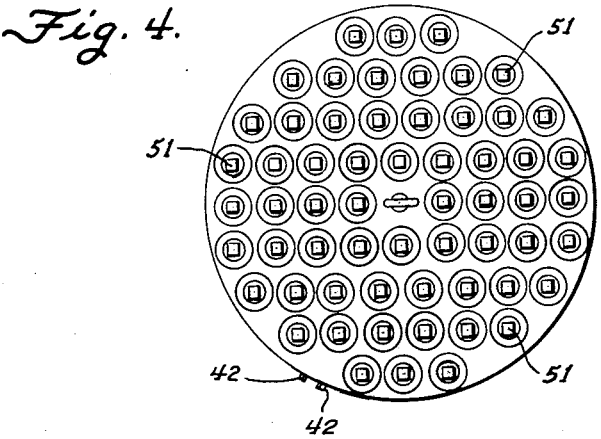
Fig. 4 is a top plan view of the assembly of Fig. 3.

The filter shell of the invention, which is made in accordance with the A.S.M.E. code for pressure filters, has a generally cylindrical body 1 with a fixed bottom 2 and removable cover 3. The securement of the cover 3 is suitable for withstanding the pressure of the liquid when the filter is operating. Such securing as here illustrated involves the clamping of the gasket 4 between a ring 5 secured around the mouth of the body 1 and ring 6 secured around the open end of the cover 3. Preferably the gasket 4 is positioned in a recess formed in the upper surface of the ring 5 leaving a portion of the gasket protruding from that upper surface for engagement with the under surface of the ring 6.

The actual clamping, as here shown, is effected by means of the series of clamping bolts 7 which are pivoted at 8 between pairs of leaves 9 secured to the body. These bolts when swung inward are receivable between pairs of receiving ears 10 extending out from the ring 6 of the cover. The bolts 7 carry nuts 11 and washers 12 therebeneath. The washers 12 seat across the upper surfaces of the receiving ears 10. Tightening of the nuts 11 tightens the seating of the washers and serves to secure the head 3 in desired leak and pressure proof position on the body.

The bottom 2 of the shell is domed concavely downwardly and is provided at its lowermost center portion with the outlet or drain pipe 13 for the filtrate. This pipe may, if desired, have a drain plug 14 secured at the mid-position of its side wall adjacent the outlet end 15. Removal of the plug 14 enables a portion of the filtrate in the pipe to be drawn off to the side, rather than letting all of it pass out through the outlet end 15.

The shell is also provided with a false bottom 16, here shown as secured at 17 to the wall of the bottom 2 just within the mouth thereof. The bottom 2, in turn, is suitably welded, or otherwise secured, at 18 within the lower end of the cylindrical body 1.

The false bottom 16 is preferably in the form of a flat plate having a large center opening 19 communicating with the chamber below it provided by the bottom 2. The false bottom 16 is also preferably provided with an opening 20 adjacent the edge thereof, which opening communicates with the interior of a pipe 21. The pipe 21 passes out through the wall of the bottom 2 and terminates in a removable drain plug 22. Thus from time to time dirty oil and any sediment contained therein which fails to pass through the filters can be drawn off through the pipe 21. Positive assurance against any of such dirty oil and sediment getting into the opening 19 can be achieved by surrounding that opening with a short upstanding collar. Such collar, shown at 23 in Fig. 1a, is welded to the false bottom 16 and is formed with a bore 24 having the same diameter and axially aligned with the bore 19 in the false bottom 16.

An inlet conduit 25 is secured to the cylindrical side wall 1 at approximately the midpoint thereof. It, of course, communicates with the interior of the body to introduce thereinto the fluid under pressure to be filtered. Provision is made on the interior of the body 1, bordering the opening for the conduit 25, for the removable mounting of a baffle to distribute the flow of fluid and prevent it from striking any of the cartridges directly. As here shown, that provision is effected by means of channel forming members 26 and 27 which mount the baffle 28. This baffle is here shown as a triangular plate formed with extremities 29 slidably received from above in the channels provided by the members 26 and 27.

Figure 3:
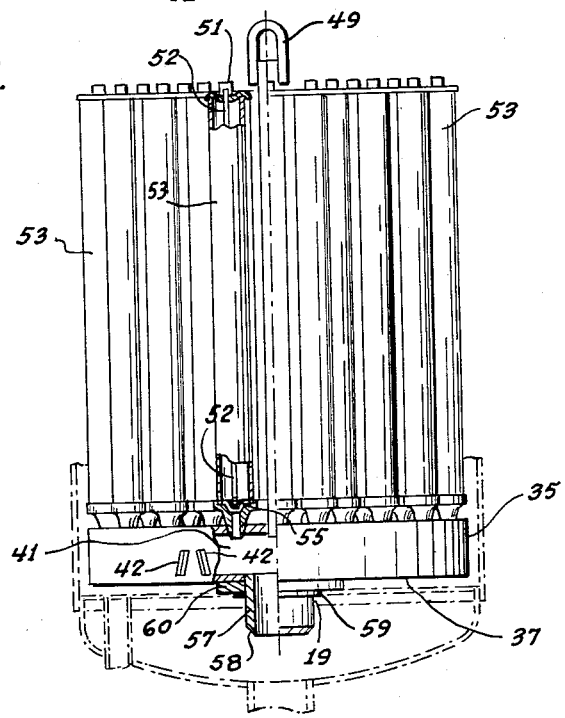
Fig. 3 is an elevation of a filter holder and cartridge assembly in accordance with the invention with parts broken away to show the interior thereof and with a fragment of the filter shell shown in dot-dash outline to illustrate the mounting of the assembly in the shell.

As is apparent from the Fig. 3 showing, the holder for the filter cartridges could not be lowered into place in the shell if the baffle 28 were in position. Furthermore, if the pattern of the filter cartridges did not leave room for the baffle to protrude in over the cartridge holder, then one of the cartridges would have to be removed. These factors are taken care of, however, by the removable mounting of the baffle and the forming of the pattern of the cartridges mounted on the holder. Thus before the holder and cartridge assembly is lowered into the shell, the baffle is removed, then the assembly is properly rotatably aligned in the shell by locating means, hereinafter described, and carried on the holder and on the shell. Once the holder is seated in place in the shell, the baffle can be replaced by merely sliding it down into position. Conversely, the baffle would be removed prior to the removal of the holder and cartridge assembly from the shell.

Pressure gages 31 and 32 are provided, with the gage 31 communicating with and indicating the pressure within the body 1, which would be the inlet pressure, while the gage 32 communicates with the bottom 2 below the plate 16 and so indicates the outlet pressure. Thus, the differential pressure developed between the compartment within the body 1 above the plate 16 and the chamber in the bottom 2 below the plate 16 can be readily determined. Suitably formed mounting legs 33 are positioned at spaced points about the periphery of the shell and are suitably secured thereto to support the shell in desired position.

Figure 5:
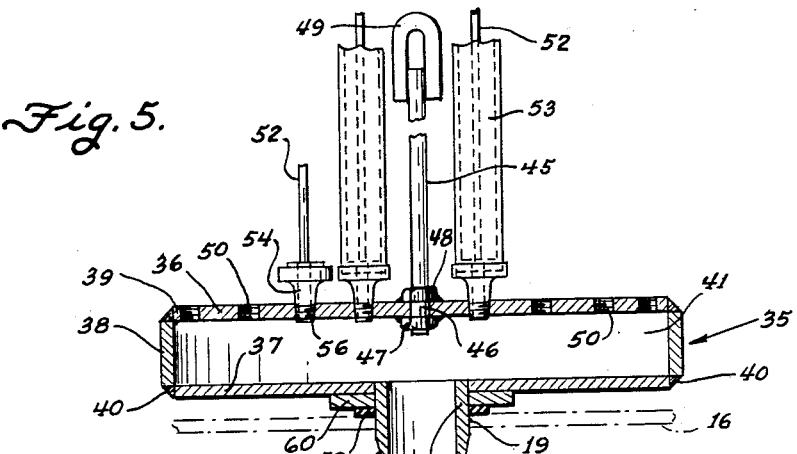
Fig. 5 is an enlarged sectional view of the holder of the invention as shown in Fig. 3 with fragments of filter cartridges and the handling rod applied thereto.

In Figs. 3, 4 and 5, is illustrated a removable filter cartridge holder, the assembly of the same with one type of cartridge, and the reception of that assembly within the filter shell. The holder, generally indicated at 35, is a shallow drumlike member having circular top and bottom plates 36 and 37 respectively, and with an annular spacing and bordering wall 38 therearound. As here shown, the top and bottom plates 36 and 37 are secured to the upper and lower edges of the side wall 38 by suitable welds 39 and 40. Alternately, however, the side wall 38 and either the top or bottom 36 and 37 could be formed integrally, such as by pressing them out of a single piece of material, leaving only one of the circular plates to be welded in place. Also, of course, other types of sealed joints could be employed in place of the joints 39 and 40, or securing means other than welding could be employed for the securing of the elements of the holder together. The principal thing to be kept in mind, however, is that the chamber 41 within the holder needs to be liquid tight and must be isolated from the liquid to be filtered flowing around in the shell.

For properly locating the holder 35, and the pattern of the filter cartridges in the shell, with respect to the position of the baffle 28, the side wall 38 of the holder is provided with outwardly extending guide bars 42. These are shown in the form of an upwardly extending V, but they do not meet at their upper end. Rather they are spaced apart sufficiently to enable them to slide down either side of the vertical guide bar 43 provided on the side of the cylindrical wall 1. Referring now to Fig. 4, it will be seen that the guide bars 42 are positioned at one of the four places on the holder as will be apparent from the Fig. 4 showing where the cartridges are set back far enough to enable the baffle 28 to protrude in over the top of the holder when it is slid into place after the filter assembly is mounted in the shell. Preferably then pairs of guide bars 42 are positioned on the side wall of the holder at each of the four positions where there is room for the baffle. Only one pair is shown, however, for purposes of illustration.

As already pointed out, the guide bars 42 incline towards each other in the form of a V. This enables them to be initially located over the guide bar 43. The fact that they do not meet at their top, however, but rather leave room for the guide bar 43 to slide therethrough, is of importance, for otherwise they might limit the extent to which the holder 35 could seat down towards the false bottom 16.

The top plate 36 is formed for the reception of the desired filter cartridges and the handling rod used in handling the assembly. Such rod 45 is preferably permanently secured to the plate 36 at its midpoint. As here shown, this is done by passing the rod through the plate 36 at 46 and securing it thereto by suitably opposed nuts 47 and 48. Then these nuts may be locked in place by fillet welds between their borders and the surfaces of the plate as shown. Obviously, other suitable means can be employed for effectively securing the rod 45 to the plate 36, it being merely necessary to keep in mind that the securing must be fully effective and must remain so since the handling of the holder and the assembly, both in and out of the shell, is effected by engaging the loop 49 at the upper end of the rod 45 by suitable handling means. This is more than just an ordinary handle member, for with the holder formed to seat in the bottom of the shell, the filter cartridges are carried solely by the plate 36 extending upwardly from it. Hence the assembly of holder and cartridges can be manipulated both in and out of the shell and mounted for cleaning and for removal and replacement of the filter cartridges all by engagement of suitable handling devices with the loop 49.

The top plate 36 is also formed with a plurality of screw threaded openings 50 therein, which openings are formed in a pattern to enable the desired number of cartridges to be mounted on the plate, as illustrated in Figs. 3 and 4. In this particular showing, the cartridges are of small diameter and have their own headers and nipple-like mounting members, with a mounting rod extending therebetween. The headers 51 are fixedly secured to the mounting rods 52 and are equipped with suitable wrenching projections so that the rods can be turned by the turning of the headers from the outside. This is necessary since, in this instance, the cylindrical filter walls 53 of the cartridges are mounted between the undersurfaces of the headers 51 and the channels provided therefor in the upper surfaces of the mounting nipples 54. This mounting of the cartridge cylinders between their end members must be a tight leakproof one. This is effected by the threading of the lower ends of the rods 52 into the hubs of receiving spiders 55 provided therefor in the nipples 54. These spiders provide passage for the filtered fluid down past the hub and out through the lower end of the nipples 54 which are formed with center bores for that purposes.

The nipples 54 are externally screw threaded at 56 for threaded reception in the openings 50 in the plate 36. Thus the internal bores of the nipples communicate through the plate 36 with the chamber 41 of the mounting member 35. Furthermore, since all of the openings 50 are equipped with filter cartridges by means of nipples 54, the only liquid which can enter the chamber 41 is the filtered liquid passing through the filter walls of the cartridges.

The filtered liquid passes out from the chamber 41 through the outlet conduit 57 which is secured at its upper end in the opening provided therefor in the plate 37 and communicates at that end with the chamber 41 and at its other end with the chamber within the bottom 2 below the false bottom 16. Before going further into that aspect of the invention, it is to be noted that the sole mounting and positioning of the filter cartridges in this instance is by means of the threading of their nipples 54 in the openings 50 in the plate 36. The tops of the cartridges merely have their own individual headers and are free from engagement by any part within the filter shell.

The conduit 57 is formed with a conical outer surface 58 at its bottom end to facilitate its introduction into the opening 19 in the plate 16. Such introduction is effected by merely lowering it into place therein. The outside diameter of the conduit 57 and the diameter of the opening 19 are so related as to provide a sliding fit. There must, however, be no possibility of a leakage path existing between the conduit 57 and the opening 19 particularly at this end of the shell, for this is where the dirty liquid being filtered will be present and such liquid must be kept separate from the filtrate. To assure against such leakage then a suitable gasket 59 is mounted on the conduit 57 and is backed up by an annular plate 60 welded to the undersurface of the bottom plate 37 of the filter holder 35. Hence, when the holder 35 is positioned in the shell with the conduit 57 protruding through the opening 19, in the plate 16, the whole weight of the holder and filter cartridges will rest on the gasket 59 compressing it and giving assurance that a tight joint is formed. Further compression of the gasket 59 and further assurance against leakage is provided by the pressure on the liquid to be filtered within the shell. This pressure acting on the holder and cartridges, pushes the holder down making sure that the gasket is further compressed and that the joint is tight.

Instead of seating on the flat surface of the false bottom 16, the gasket 59 may seat on the upper end of the collar 23, as illustrated in Fig. 1a. This collar is made wide enough for effective seating of the gasket and, in fact, may have its upper end face inclined inwardly or otherwise formed to trap the gasket and cause it to flow in tightly against the conduit 57 as it is compressed. In any event, the forces tending to compress the gasket would be the same as where the gasket engages the flat surface 16.

Figure 6:
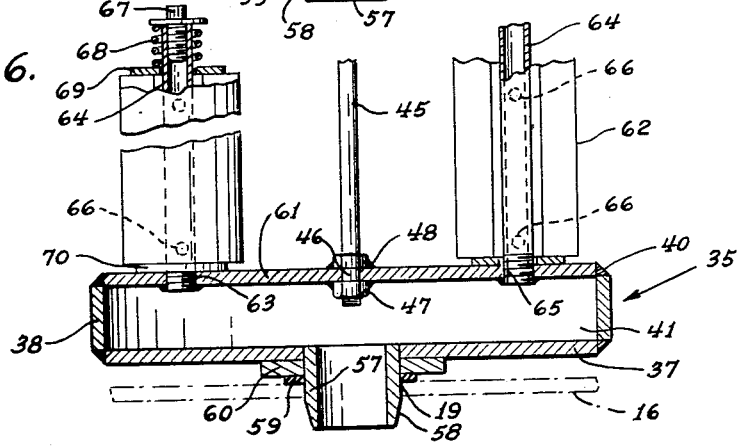
Fig. 6 is a similar view illustrating the application of another type of cartridge to the holder.

The holder 35 in Fig. 6 is, in all principal respects, the same as that in Fig. 5, so the same reference characters are applied to the common parts and repetition of the description of those parts is not necessary. The top plate 61 of the Fig. 6 holder differs somewhat from its counterpart, inasmuch as the filter cartridges 62 of Fig. 6 are of much greater diameter than those shown at 53 in Figs. 3, 4 and 5. Accordingly, the screw threaded openings 63 in the plate 61 will need to be further apart than the openings 50 in the plate 36, are larger and are formed in a different pattern to provide for the mounting of the desired number of the cartridges.

In this instance the means for mounting the filter cartridges on the holder also serves as the means for transmitting the filtrate to the chamber 41. In other words, instead of being held in place by rods, the cartridges 62 are held by pipes 64 which are screw threaded at the lower ends 65 for reception in the threaded holes 63. These pipes are perforated at spaced positions along their length, as shown at 66, so that the fluid filtered by the filter wall of the cartridge will pass into the pipe 64 and down it into the chamber 41. On their upper ends these pipes protrude above the actual filter walls and are provided with suitable means for closing them and for maintaining the cartridges in place.

As an example, in the Fig. 6 showing, a plug 67 is screwed into the upper end of the pipe 64 to close that end. Beneath its head the plug 67 engages a spring 68 which surrounds the protruding part of the pipe 64 and engages a gasket 69 at its other end. This gasket seats on the upper end of the filter element 62 and thus holds the cartridge down against the gasket 70 which is positioned between the lower end of the cartridge and the upper surface of the holder wall 61.

Figure 7:
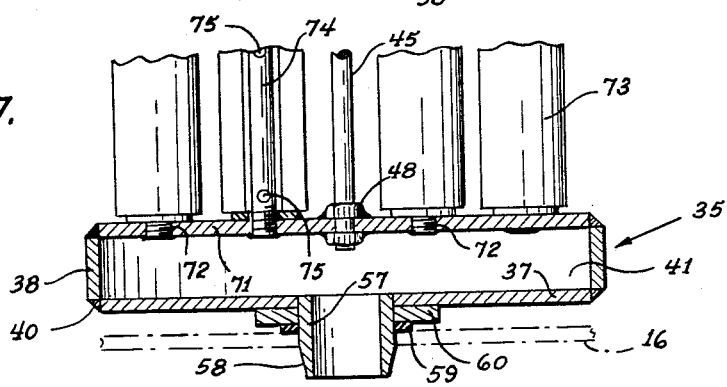
Fig. 7 is a similar view illustrating the application of another cartridge.

Another filter pattern is illustrated in Fig. 7 where, again, the holder 35 is the same as those previously described, with the exception of the top plate thereof. The top plate 71, in this instance, is provided with a greater number of perforations 72 than in the plate 61, but a lesser number than that of the Fig. 5 showing. Actually, as seen in Fig. 4, the arrangement of Figs. 3–5 provides for the mounting of 60 cartridges, that of Fig. 6 for the mounting of 16 cartridges, while that of Fig. 7 enables the mounting of 30 cartridges in the Fig. 6 manner, the cartridges being of smaller diameter. Thus the cartridge filters 73 in Fig. 7 are each mounted on the top plate 71 by means of pipes 74 having spaced perforations 75 extending through the walls thereof. Again, these pipes not only serve as holders, but they also serve to transmit the filtered fluid down into the chamber 41. Also each of the cartridge filters here is held in place on its pipe 74 by suitable means which also closes the upper end of the pipe as illustrated in Fig. 6.

It is believed to be apparent from the foregoing that the structure of the invention accomplishes the objects thereof as set forth at the outset and also introduces additional improvements into the art. The purchasers of filters in accordance with the invention merely needs to have on hand holders, such as shown at 35, in a sufficient small number required to meet his requirements. In other words, if he is using all the same type of cartridge, he merely needs one spare holder equipped with cartridges, so that when he removes one assembly from the filter shell he has another one all ready to insert in place of it. Furthermore, that removal merely calls for freeing and removing the top of the shell and lifting the holder and assembly out by engaging the loop member 49. Similarly, the replacement is just lowered in place until the conduit 57 engages with the opening 19, or the openings 19 and 24 as the case may be, which is all the holding and positioning of the assembly within the filter shell that is needed. The assembly that has been removed for cleaning and repair can, contrary to any assembly found in the prior art, be readily handled and worked on, since it can be either hung from the loop 49 or placed across supports with sufficient space for the conduit 57 to extend downwardly.

If the user wishes to be in a position to change from one type of filter cartridge to another, he merely needs to have on hand the necessary holders for carrying such different cartridges. In some instances, by plugging certain of the holes in the top plate of the holder he can use the same holder for different cartridges. When a new cartridges comes on the market, calling for a different pattern, he merely needs to obtain a suitable holder for it and continues using his existing filter shell. These holders are simple, economical members involving only a minor initial cost and they are continuously saving substantial sums in greater utilization of the filter and reduction of labor costs for maintenance and repair.

Though particular structures and relationships of parts for the carrying out of the invention have been shown in the foregoing and illustrated in the accompanying drawing, it is of course to be understood that such are for illustrative and not for limiting purposes. Changes in the structure set forth and other embodiments of the invention will suggest themselves to those skilled in the art and may be made without departing from the spirit and scope of the invention.

Having described our invention what we claim as new and desire to secure by Letters Patent is:

1. In fluid filter construction, a removable filter cartridge and holder assembly for ready insertion into and removal from a filter shell which comprises, a holder in the form of a shallow drum having opposed top and bottom plates and a peripheral joining plate joining said top and bottom plates together in spaced relation to form a fluid tight chamber therewithin, an outlet conduit extending downwardly from said bottom plate and formed with a passage therethrough in communication with said chamber, said top plate formed with a plurality of perforations therethrough, a plurality of hollow filter cartridges, one overlying each of said perforations and extending upwardly from said top plate and means engaged in said perforations for mounting said cartridges in said upwardly extending position, said means engaged in said perforations being the sole mounting means for said cartridges.

2. In fluid filter construction, a removable filter cartridge and holder assembly for ready insertion into and removal from a filter shell which comprises, a holder in the form of a shallow drum having opposed top and bottom plates and a peripheral joining plate joining said top and bottom plates together in spaced relation to form a fluid tight chamber therewithin, an outlet conduit extending downwardly from said bottom plate and formed with a passage therethrough in communication with said chamber, said top plate being formed with a plurality of perforations therethrough, a plurality of hollow filter cartridges, one overlying each of said perforations and extending upwardly from said plate and means engaged in said perforations for mounting said cartridges in said upwardly extending position, said mounting means including conduit means for passing filtrate into said chamber.

3. In fluid filter construction, a removable cartridge and holder assembly for ready insertion into and removal from a filter shell which comprises, a holder in the form of a shallow drum having opposed top and bottom plates and a peripheral joining plate joining said top and bottom plates together in spaced relation to form a fluid tight chamber therewithin, an outlet conduit extending downwardly from said bottom plate and formed with a passage therethrough in communication with said chamber, said top plate being formed with a plurality of perforations therethrough, a plurality of hollow filter cartridges, one overlying each of said perforations and extending upwardly from said plate, nipples engaged in said perforations, and formed for the passage of filtrate therethrough, means on said nipples for receiving one end of said cartridges and mounting rods secured on one end in said nipples and extending to the other end of said cartridges for mounting said cartridges in place on said nipples.

4. In fluid filter construction, a removable cartridge and holder assembly for ready insertion into and removal from a filter shell which comprises, a holder in the form of a shallow drum having opposed top and bottom plates and a peripheral joining plate joining said top and bottom plates together in spaced relation to form a fluid tight chamber therewithin, an outlet conduit extending downwardly from said bottom plate and formed with a passage therethrough in communication with said chamber, said top plate being formed with a plurality of perforations therethrough, a plurality of hollow filter cartridges, one overlying each of said perforations and extending upwardly from said plate and pipes engaged in said perforations for mounting said cartridges in said upwardly extending position, said pipes extending up through said cartridges and being formed with perforations in the wall thereof.

5. In fluid filter construction, a filter shell formed with a top, side wall and bottom, a false bottom within said filter shell extending across the same and secured in leak-proof relation with respect to the said side wall and in upwardly spaced position with respect to said bottom to form a chamber therebetween, said false bottom being provided with a first centrally positioned perforation therethrough communicating with said chamber, said false bottom being formed with a second perforation therethrough spaced from said first perforation and a conduit communicating with said second perforation, said conduit extending through said chamber, and outwardly through the wall of said bottom to provide for the draining of residue from above said false bottom.

6. In fluid filter construction formed for the ready removal and replacement of filter cartridges which comprises a filter shell formed with a side wall, top and bottom, a false bottom secured in said filter shell in upwardly spaced relation with respect to said bottom, said false bottom being formed with a perforation therethrough, and a removable holder for filter cartridges mounted within said shell on said false bottom, said holder being in the form of a receptacle with spaced top and bottom walls and a side wall, said bottom wall being formed with a perforation therethrough in alignment with the perforation in said false bottom and a conduit bordering said opening in said bottom wall and communicating with said opening in said false bottom, said conduit serving to mount said holder on said false bottom.

7. Construction as in claim 6 wherein said conduit is carried by said bottom wall, is slidably receivable in said perforation in said false bottom and serves as the sole means for mounting said holder within said shell.

8. Construction as in claim 6 wherein there is gasket means between said bottom wall and said false bottom, said gasket means surrounding said conduit and preventing leakage between said conduit and said perforation.

9. Construction as in claim 6 wherein there is a collar formed on said false bottom surrounding said perforation and extending upwardly around the same, said collar receiving said conduit.

10. Construction as in claim 9 wherein there is compressible gasket means between the upper end of said collar and the underside of said bottom wall.

11. Construction as in claim 6 wherein said top wall is formed with perforations therethrough for the mounting of filter cartridges thereon and a plurality of filter cartridges is mounted on said top wall.

12. In fluid filter construction formed for the ready removal and replacement of filter cartridges which comprises, a filter shell formed with a side wall, top and bottom, a support carried by said bottom for mounting a filter holder within said shell adjacent said bottom, said support including a collar having an opening therethrough, a removable holder for filter cartridges mounted within said shell, said holder being in the form of a receptacle with spaced top and bottom walls and a side wall, said bottom wall being formed with a perforation therethrough in alignment with the opening in said collar and a conduit bordering said opening in said bottom wall and communicating with said opening in said collar, said conduit serving to mount said holder in said collar.

13. Fluid filter construction as in claim 12 wherein said conduit is carried by said bottom wall, is slidably receivable in said collar and serves as the sole means for mounting said holder within said shell.

14. Fluid filter construction as in claim 13 and including gasket means between said bottom wall and the upper surface of said collar, said gasket means surrounding said conduit being compressed by the weight of said filter holder and preventing leakage between said conduit and the opening in said collar.

15. Fluid filter construction as in claim 14 wherein said top wall of said removable holder is formed with perforations therethrough for the mounting of filter cartridges thereon and a plurality of filter cartridges mounted on said wall.

References Cited in the file of this patent

UNITED STATES PATENTS

| | | |
|---|---|---|
| 385,333 | Way | June 26, 1888 |
| 468,604 | Jones | Feb. 9, 1892 |
| 602,304 | Chamberland | Apr. 12, 1898 |
| 654,592 | Barr | July 31, 1900 |
| 1,172,689 | Elliot | Feb. 22, 1916 |
| 1,905,738 | Norquist et al. | Apr. 25, 1933 |
| 2,301,430 | Malanowski | Nov. 10, 1942 |
| 2,374,976 | Briggs et al. | May 1, 1945 |
| 2,440,487 | Rayburn | Apr. 27, 1948 |
| 2,548,400 | Shepard | Apr. 10, 1951 |
| 2,609,933 | Ross | Sept. 9, 1952 |
| 2,657,808 | Mankin | Nov. 3, 1953 |
| 2,693,882 | Olson et al. | Nov. 9, 1954 |

FOREIGN PATENTS

| | | |
|---|---|---|
| 3,423 | Great Britain | Mar. 17, 1885 |